(12) United States Patent
Miller et al.

(10) Patent No.: US 6,490,253 B1
(45) Date of Patent: Dec. 3, 2002

(54) PEER TO PEER INTERCONNECT DIAGNOSTICS

(75) Inventors: Michael Howard Miller, Eden Prairie, MN (US); James Allen Coomes, White Bear Lake, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/718,995

(22) Filed: Nov. 22, 2000

Related U.S. Application Data
(60) Provisional application No. 60/166,805, filed on Nov. 22, 2000.

(51) Int. Cl.[7] ............................................. H04L 12/26
(52) U.S. Cl. ..................................................... 370/241
(58) Field of Search ................................ 370/244, 242, 370/245, 248, 249, 250, 251, 221, 222; 709/224; 714/4, 5, 712, 716, 717

(56) References Cited

U.S. PATENT DOCUMENTS

| | | | | |
|---|---|---|---|---|
| 3,564,145 A | * | 2/1971 | Deutsch et al. ............. | 370/216 |
| 4,354,229 A | * | 10/1982 | Davis et al. ................ | 64/222.2 |
| 4,769,761 A | * | 9/1988 | Downes et al. ............. | 709/224 |
| 5,278,823 A | | 1/1994 | Handel | |
| 5,537,653 A | | 7/1996 | Bianchini, Jr. | |
| 5,684,807 A | | 11/1997 | Bianchini, Jr. et al. | |
| 5,812,754 A | * | 9/1998 | Lui et al. ....................... | 714/6 |
| 5,881,051 A | | 3/1999 | Arrowood et al. | |

OTHER PUBLICATIONS

Fibre Channel—Arbitrated Loop (FC–AL) Rev 4.5—Published Jun. 1, 1995 by American National Standards Institute.

* cited by examiner

Primary Examiner—Kwang Bin Yao
(74) Attorney, Agent, or Firm—Mitchell K. McCarthy (57) ABSTRACT

An information handling system, such as a disc drive, includes a controller that communicates with other devices in a loop, and performs distributed or peer-to-peer loop error diagnostics. One example of a loop is a fiber channel arbitrated loop. Distributed or peer-to-peer loop error diagnostics identifies and diagnoses errors in the immediately upstream device and the immediately upstream link by monitoring the error count to determine of the error count is increasing or not. An increasing error count or a changed loop configuration indicates that the source of the error is not the upstream device, while an unchanging error count and an unchanged loop configuration indicates that the source of the error is the upstream link.

17 Claims, 8 Drawing Sheets

PEER TO PEER INTERCONNECT DIAGNOSTICS

RELATED APPLICATION

This application claims the benefit of U.S. Provisional Application Ser. No. 60/166,805, filed Nov. 22, 2000 under 35 U.S.C. 219(e).

FIELD OF THE INVENTION

The present invention relates to the field of loop diagnostics. More particularly, this invention relates to a peer-to-peer interface diagnostics.

BACKGROUND OF THE INVENTION

One key component of any computer system is a device to store data. Computer systems have many different places where data can be stored. One common place for storing massive amounts of data in a computer system is on a disc drive. The most basic parts of a disc drive are a disc that is rotated, an actuator that moves a transducer to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

Information representative of data is stored on the surface of the storage disc. Disc drive systems read and write information stored on tracks on storage discs.

Fibre Channel (FC) is a serial data transfer architecture standardized by ANSI. A prominent FC standard is Fibre Channel Arbitrated Loop (FC-AL). This standard defines a distributed daisy-chained loop. FC provides for peer-to-peer communication on this loop.

FC-AL was designed for new mass storage devices and other peripheral devices that require very high bandwidth. FC-AL supports the Small Computer System Interface (SCSI) command set in addition to other upper level protocols. The mapping of these upper level protocols to FC is referred to as the FC-4 layer.

In a FC-AL, information from an originating device can pass through multiple other devices, and the links between the devices, before arriving at the recipient device. While the passage of information on multiple links adds complexity to isolating marginal and failing links over point to point connections, three conventional techniques of isolating marginal links exist. One technique of isolating marginal FC links uses link status to isolate the problem link. A second approach uses error-reporting features of the FC-4 mapping. A third approach is a combination of the first two.

A primary requirement for the three techniques is knowledge of the topology (i.e. connection order). Knowledge of the topology may be obtained during FC-AL defined loop initialization from the loop position map or by implicit means. An example of an implicit means is an enclosure of disks drives using hard addresses.

A first approach of using link status in the isolation of marginal links requires a management application (MA) in at least one of the devices on the loop. Several MAs may be implemented to cover the failure of any one. An MA may either periodically poll the loop during normal loop operation or request devices detecting link errors to report the incident. In polling mode, the link status accumulated in all the devices is used to locate marginal links. In the report error, identification mode, status accumulated from all devices reporting errors is used to locate marginal links.

The isolation of the source of a single error is possible with this approach but not guaranteed.

The use of link status makes the approach FC-4 independent. This is an advantage in multiple protocol loops. However, the drawback of using link status is the polling or report error mode overhead reduces the efficiency of the loop.

The second approach uses error-reporting features of the FC-4 mapping. Using FC-4 reported errors to isolate the source of errors on loops requires maintaining a log of the errors. The source is located by analyzing the log to determine which devices are reporting errors and which are not.

Using FC-4 reported errors to isolate the source of errors on loops removes the requirement for an MA to maintain link error history and poll the loop. Not polling the loop reduces overhead on the loop. Additionally, errors are only report when they occur.

Using FC-4 reported errors to isolate the source of errors on loops performs best in implementations in which a single master device receives all the reported errors. An example of such an implementation is a single initiator SCSI storage subsystem.

There are at least three drawbacks to relying on just the FC-4 error status. The occurrence of a single error does not provide sufficient information to isolate the source. Furthermore, status must be accumulated to build a history in order to isolate the error source. Lastly, in loops supporting multiple protocols or multiple devices that receive FC-4 status, implementation becomes difficult because the errors are not reported to a common destination device.

The third technique of isolating marginal FC links uses link status and FC-4 error reporting to isolate the problem link. Polling is not used and the isolation of the source of a single error is possible.

As with any use of link status, an MA is needed to keep error counts of all devices. When a FC-4 error is reported or the MA detects a link error, the MA reads the accumulated link status from all devices to determine the possible source of the error.

A disadvantage to implementation on loops with multiple FC-4s is the MA must support all the FC-4s.

Figure 1:
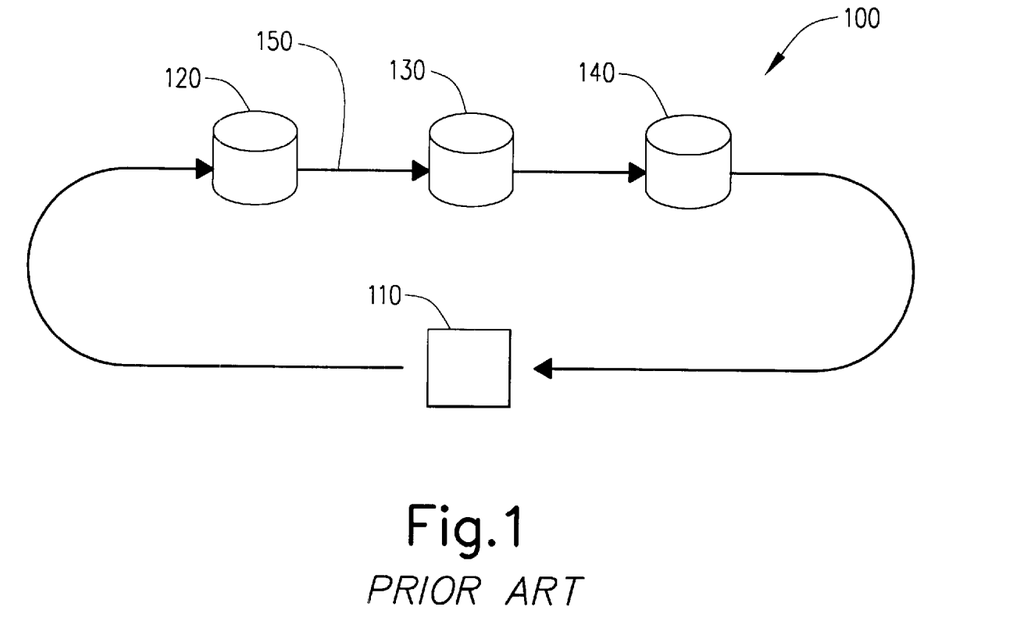
FIG. 1 is a block diagram of a conventional loop comprised of SCSI FC channel protocol devices.

Referring to FIG. 1, a diagram of a loop 100 comprised of SCSI Fibre Channel Protocol (FCP) devices, is shown. The loop includes a SCSI initiator device, 110, that serves as the loop master, communicating with SCSI target devices 120, 130, and 140. The link or interconnect 150 between devices 120 and device 130 is marginal and/or failing.

Error detection and reporting provided by a FC-4 may be used for the isolation of marginal links when available.

Due to the marginal link 150, loop master 110 will experience command time-outs and data errors. The command time-outs are the result of errors during command, transfer ready, or response frames. These frames are discarded when they are received in error. Because the time-out could result from discarded frames to the targets, commands, or from the targets, transfer readies and responses, the location of the bad link can not be determined.

On write data operations, device 120 does not experience errors on data from loop master 110. Device 120 and device 130 will, however, detect the errors introduced by the marginal link. Errors on write data are reported in the FCP Response.

On read data operations, loop master 110 does not detect errors on read data from device 130 and device 140.

What is needed are loop error diagnostics that do not require knowledge of the topology of the loop, that reduces loop overhead traffic, and increases the effectiveness of the diagnostics.

SUMMARY OF THE INVENTION

In a peer to peer approach to isolation of error source, the management application (MA) function is distributed to all devices on the loop. Link status is used for error source isolation. More specifically, each device maintains the identity and the link error status of the device connected to its input, upstream device. When a device detects a link error on its input, the device initiates a request to the upstream device for link error counts.

When the link status for the upstream device indicates that device is also detecting link errors, the source of the errors is a different link on the loop. If the link status from the upstream devices does not indicate it is detecting errors, the source of the errors is likely the interconnect between the upstream device and the device itself. The device may then initiate diagnostic transfers between the upstream device and itself to verify the interconnect is marginal.

Advantageously, the present invention of loop error diagnostics does not require knowledge of the complete topology of the loop. The present invention also reduces loop overhead traffic because error isolation is distributed to each of the devices in the loop. Furthermore the effectiveness of loop diagnostics is increased because devices closest to the source of the problem perform the diagnostics. In addition, the present invention minimizes degradation of performance of each device on the loop because the diagnostic function in each device is enabled to execute when the device is idle, thereby, preventing the diagnostics from affecting the performance of the device during higher priority tasks.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 2:
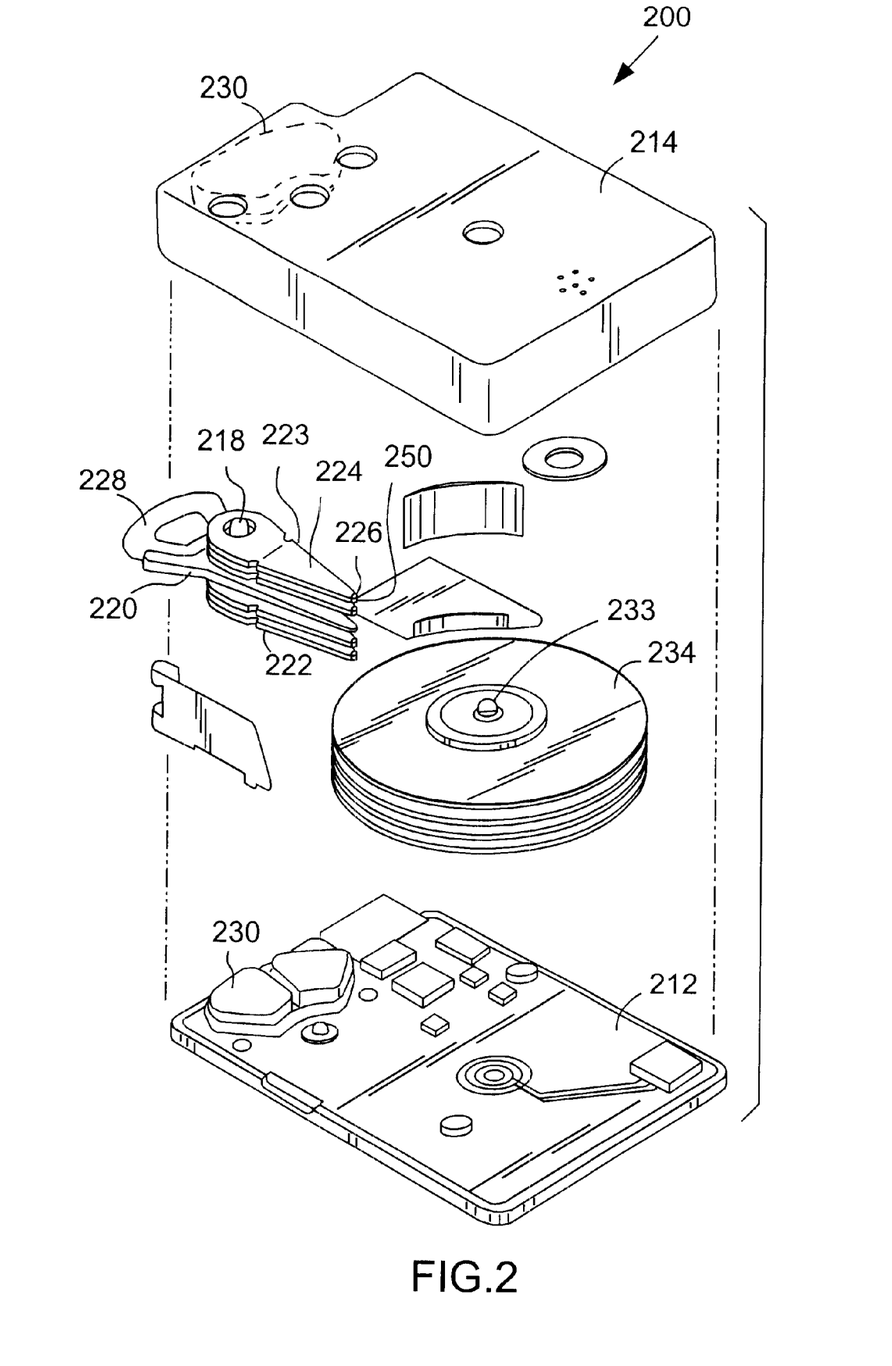
FIG. 2 is an exploded view of a disc drive with a multiple disc stack and a ramp assembly for loading and unloading transducers to and from the surfaces of the discs.

The invention described in this application is useful with all mechanical configurations of disc drives having either rotary or linear actuation. In addition, the invention is also useful in all types of disc drives including hard disc drives, zip drives, floppy disc drives and any other type of drives where unloading the transducer from a surface and parking the transducer may be desirable. FIG. 2 is an exploded view of one type of a disc drive 200 having a rotary actuator. The disc drive 200 includes a housing or base 212, and a cover 214. The base 212 and cover 214 form a disc enclosure. Rotatably attached to the base 212 on an actuator shaft 218 is an actuator assembly 220. The actuator assembly 220 includes a comb-like structure 222 having a plurality of arms 223. Attached to the separate arms 223 on the comb 222, are load beams or load springs 224. Load beams or load springs are also referred to as suspensions. Attached at the end of each load spring 224 is a slider 226 which carries a magnetic transducer 250. The slider 226 with the transducer 250 form what is many times called the head. It should be noted that many sliders have one transducer 250 and that is what is shown in the figures. It should also be noted that this invention is equally applicable to sliders having more than one transducer, such as what is referred to as an MR or magneto resistive head in which one transducer 250 is generally used for reading and another is generally used for writing. On the end of the actuator arm assembly 220 opposite the load springs 224 and the sliders 226 is a voice coil 228.

Attached within the base 212 is a first magnet 230 and a second magnet 231. As shown in FIG. 2, the second magnet 231 is associated with the cover 214. The first and second magnets 230, 231, and the voice coil 228 are the key components of a voice coil motor which applies a force to the actuator assembly 220 to rotate it about the actuator shaft 218. Also mounted to the base 212 is a spindle motor. The spindle motor includes a rotating portion called the spindle hub 233. In this particular disc drive, the spindle motor is within the hub. In FIG. 2, a number of discs 234 are attached to the spindle hub 233. In other disc drives a single disc or a different number of discs may be attached to the hub. The invention described herein is equally applicable to disc drives which have a plurality of discs as well as disc drives that have a single disc. The invention described herein is also equally applicable to disc drives with spindle motors which are within the hub 233 or under the hub.

Figure 3:
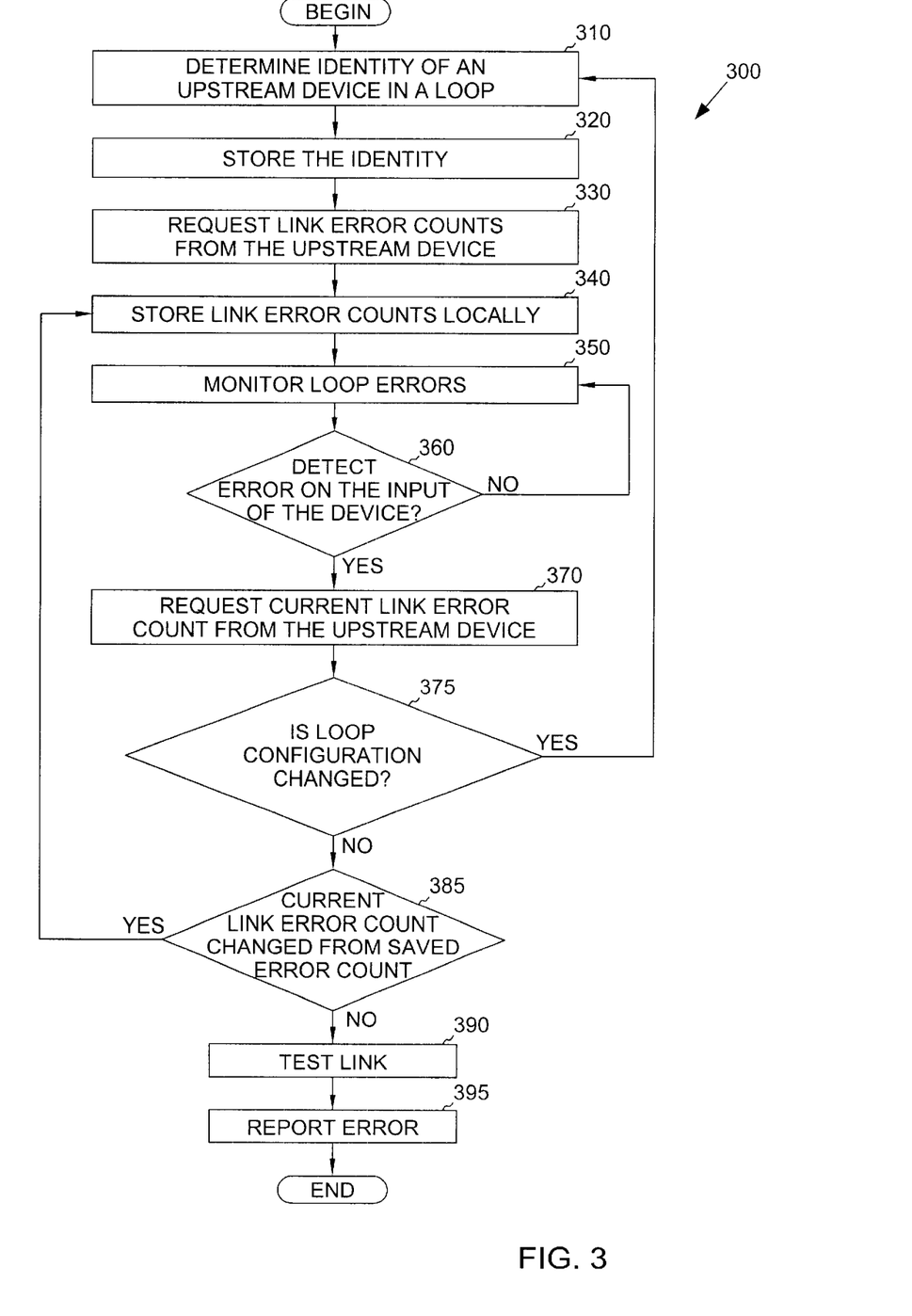
FIG. 3 is a process diagram of a method of loop error diagnostics.

Referring next to FIG. 3, a process diagram of a method 300 of loop error diagnostics is shown. Method 300 includes determining the identity of an upstream device in a loop 310. Thereafter, method 300 includes saving the identity 320. In one embodiment, the determining step 310 and the saving step 320 are performed during initialization of a device. In another embodiment, the identity of an upstream device in the loop is retrieved from a loop map. Subsequently, method 300 includes requesting link error counts from the upstream device in the loop 330. Method 300 also includes storing the link error counts locally 340. Subsequently, method 300 includes monitoring the loop for errors 350. Thereafter, method 300 includes determining if an error exists on the input of the device 360. If not, the method continues at action 350. If an error does exist, then a current link error count from the upstream device in the loop is requested 370. The method subsequently determines if the configuration of the loop has changed. If the configuration of the loop has changed, then the method continues with action 310, otherwise the method continues with determining if the current link error count is changed in comparison to the saved error count 385. If the current link error count is changed in comparison to the saved error count, which indicates an error elsewhere in the loop, the method continues at action, store link error counts locally 340. If the current link error count is unchanged in comparison to the saved error count, the error occurred on the link between the upstream device and the device detecting the error and the method continues at test link 390 and the error is reported 395.

The present invention of loop error diagnostics does not require knowledge of the complete topology of the loop and reduces loop overhead traffic because error isolation is distributed to each of the devices in the loop. Furthermore the effectiveness of loop diagnostics is increased because devices closest to the source of the problem perform the diagnostics. In addition, the present invention minimizes degradation of performance of each device on the loop because the diagnostic function in each device is enabled to execute when the device is idle, thereby, preventing the diagnostics from affecting the performance of the device during higher priority tasks.

Figures 4, 5:
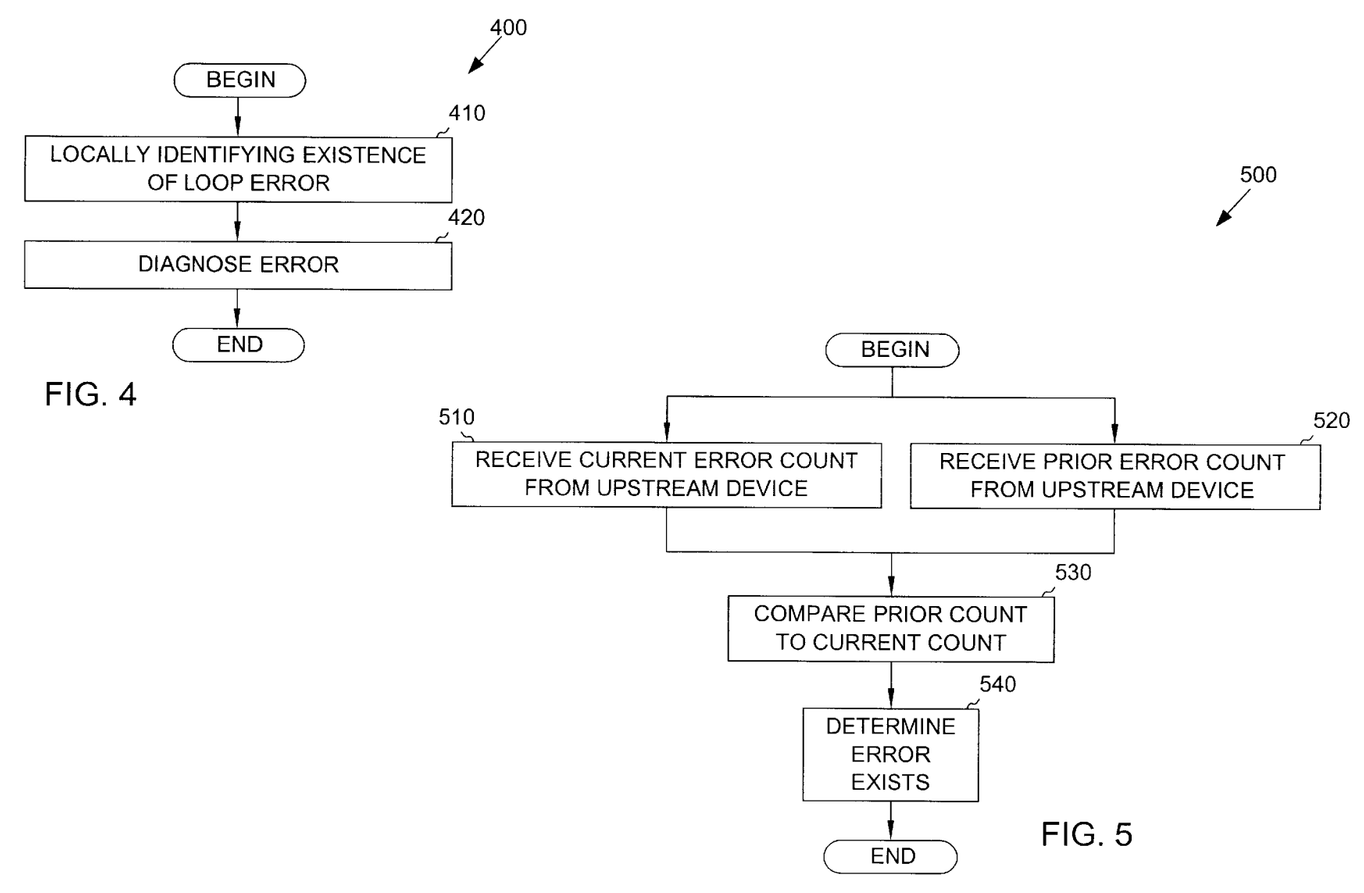
FIG. 4 is a process diagram of a method of loop error diagnostics.
FIG. 5 is a process diagram of a method of identifying an error condition recorded locally on a in a distributed daisy-chained peer-to-peer loop.

Referring next to FIG. 4, a process diagram of a method 400 of loop error diagnostics is shown. Method 400 includes identifying a link error condition recorded locally on a device in a distributed daisy-chained peer-to-peer loop 410. The identifying is described in further detail in conjunction with FIG. 5 below. In one embodiment, the distributed daisy-chained peer-to-peer loop is a Fibre Channel arbitrated loop (FC-AL). In another embodiment, the device is a disc drive, as in disc drive 200 in FIG. 2.

Fibre Channel (FC) devices detect and count errors that the devices receive. The counts are saved in the Link Error Status Block (LESB). Errors that may be encountered in devices include link failure (e.g. a loss of word synchronization for more than a specified time), loss of synchronization (e.g. loss of word synchronization for less than a specified time and invalid transmission of more than a specified number of words), an invalid transmission word in which a running disparity error or invalid characters are detected, and/or an invalid cyclic redundancy check.

If any field in the LESB is increasing, the device is detecting errors.

There are several techniques well known to those skilled in the art to obtain the link status from devices on a loop. One technique uses a read link status (RLS) extended link service (ELS), which returns the LESB for the addressed device. In one embodiment of RLS ELS, a device supports an implementation of RLS that allows the LESB for the device receiving the RLS. Another embodiment of obtaining the link status from devices on a loop is through use of a Small Computer System Interface (SCSI) log sense command, in which a disc drive returns the LESB in a log page. This technique is for systems with device drivers that do not pass FC ELS information to applications. Yet another embodiment of obtaining the link status from devices on a loop is through use of enclosure services interface (ESI), in which a disc drive that supports the SFF Committee industry group specification (SFF) 8067 defined enclosure initiated ESI. One function provides the LESB, loop initialization counts, and current status for both devices to the enclosure processor. The enclosure processor may use this information for loop management or provide it to another management entity. Still another embodiment of obtaining the link status from devices on a loop is through use of report device status (RPS) ELS, in which the LESB is with the RLS requested device, loop initialization counts, and the current status of that device.

The common element of each of these methods of obtaining the link status from device devices on a loop is the LESB.

Method 400 also includes diagnosing the error 420. Method 400 of loop error diagnostics does not require knowledge of the complete topology of the loop and reduces loop overhead traffic because error isolation is distributed to each of the devices in the loop. Furthermore the effectiveness of loop diagnostics is increased because devices closest to the source of the problem perform the diagnostics. In addition, method 400 minimizes degradation of performance of each device on the loop because the diagnostic function in each device is enabled to execute when the device is idle, thereby, preventing the diagnostics from affecting the performance of the device during higher priority tasks.

Referring next to FIG. 5, a process diagram of a method 500 of identifying an error condition recorded locally on a device that is other than in a distributed daisy-chained peer-to-peer loop, as in step 410 in FIG. 4, is shown.

Method 500 includes receiving a current error status count from a local source for an immediately upstream device in the distributed daisy-chained peer-to-peer loop 510. Method 500 also includes receiving a prior error status count from a local source for an immediately upstream device in the distributed daisy-chained peer-to-peer loop 520. In one embodiment, the receiving 520 is performed during initialization of the device. In varying embodiments, the receiving 520 is performed before, during and/or after the receiving 510. Thereafter, method 500 includes comparing the current error status count to the prior error status count 530. Subsequently, method 500 includes determining that the comparison indicates an error 540.

Figure 6:
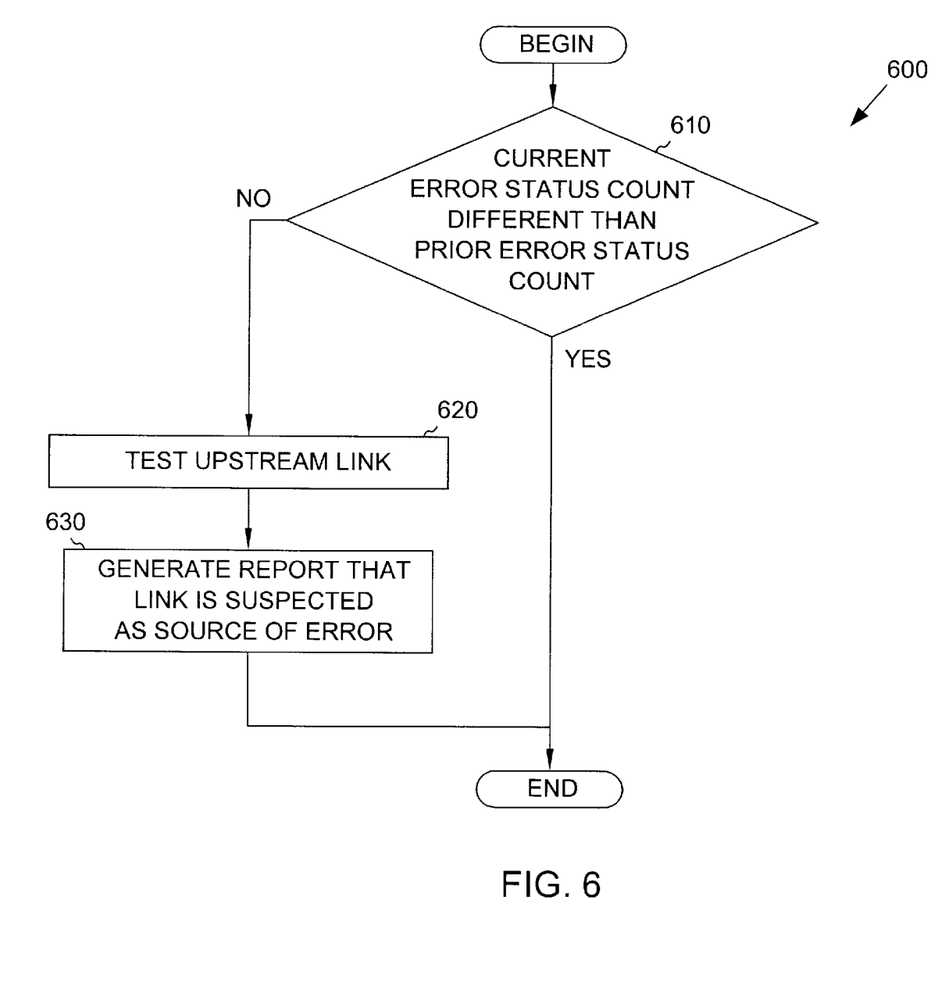
FIG. 6 is a process diagram of a method of determining, diagnosing, and resolving errors.

Referring next to FIG. 6, a process diagram of a method 600 of determining, diagnosing, and resolving errors, is shown. In method 600, the determining step 540 in FIG. 5 determines that the current error status count is different than the prior error status count 610. Subsequently, in method 600, the diagnosing step 410 in FIG. 4 includes testing the link between the device and the immediately upstream device 620 in the distributed daisy-chained peer-to-peer loop. In one embodiment of testing 620, testing includes transmitting data around the loop from the device to the device through the distributed daisy-chained peer-to-peer loop and determining whether or not the data was not received by the device as it was transmitted.

If an error is determined in the upstream link, an error report is generated indicating that the error is suspected to be in a link between the device and the immediately upstream device 630 in the distributed daisy-chained peer-to-peer loop. In varying embodiments, the generating 630 is performed before, during and/or after the testing 620.

Figure 7:
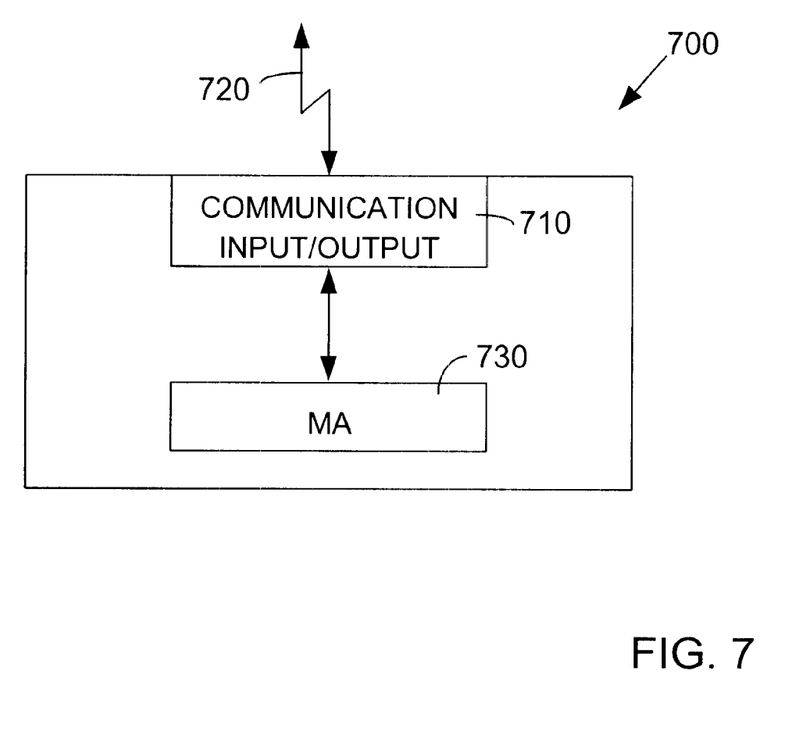
FIG. 7 is a block diagram of a peer apparatus in a loop that determines errors in the upstream device and/or the upstream link.

FIG. 7 a block diagram of a peer apparatus 700 in a loop.

The apparatus 700 includes a communication input/output component 710 operably coupled to the loop 720. The apparatus determines errors in the upstream device and/or the upstream link. In one embodiment, the loop 720 is a FC-AL. The remainder of the loop 720 includes at least one other device (not shown) that is upstream in the loop 720 from the peer apparatus 700. In one embodiment, the other devices in the loop are peer apparatus 700. The communication device 710 is operably coupled to a loop error isolation management application 730. In varying embodiments, the loop error isolation management application 730 performs the steps of methods 300, 400, 500 and/or 600.

The peer apparatus 700 does not require knowledge of the complete topology of the loop. The peer apparatus 700 reduces loop overhead traffic because error isolation is distributed to each of the devices in the loop. Furthermore the effectiveness of loop diagnostics is increased because peer apparatus 700 closest to the source of the problem performs the diagnostics. In addition, the present invention minimizes degradation of performance of each device on the loop because the diagnostic function in each peer apparatus 700 is enabled to execute when the peer apparatus 700 is idle, thereby, preventing the diagnostics from affecting the performance of the peer apparatus 700 during higher priority tasks.

In one embodiment, the peer apparatus 700 includes a disc drive, such as disc drive 200 in FIG. 2.

Figure 8:
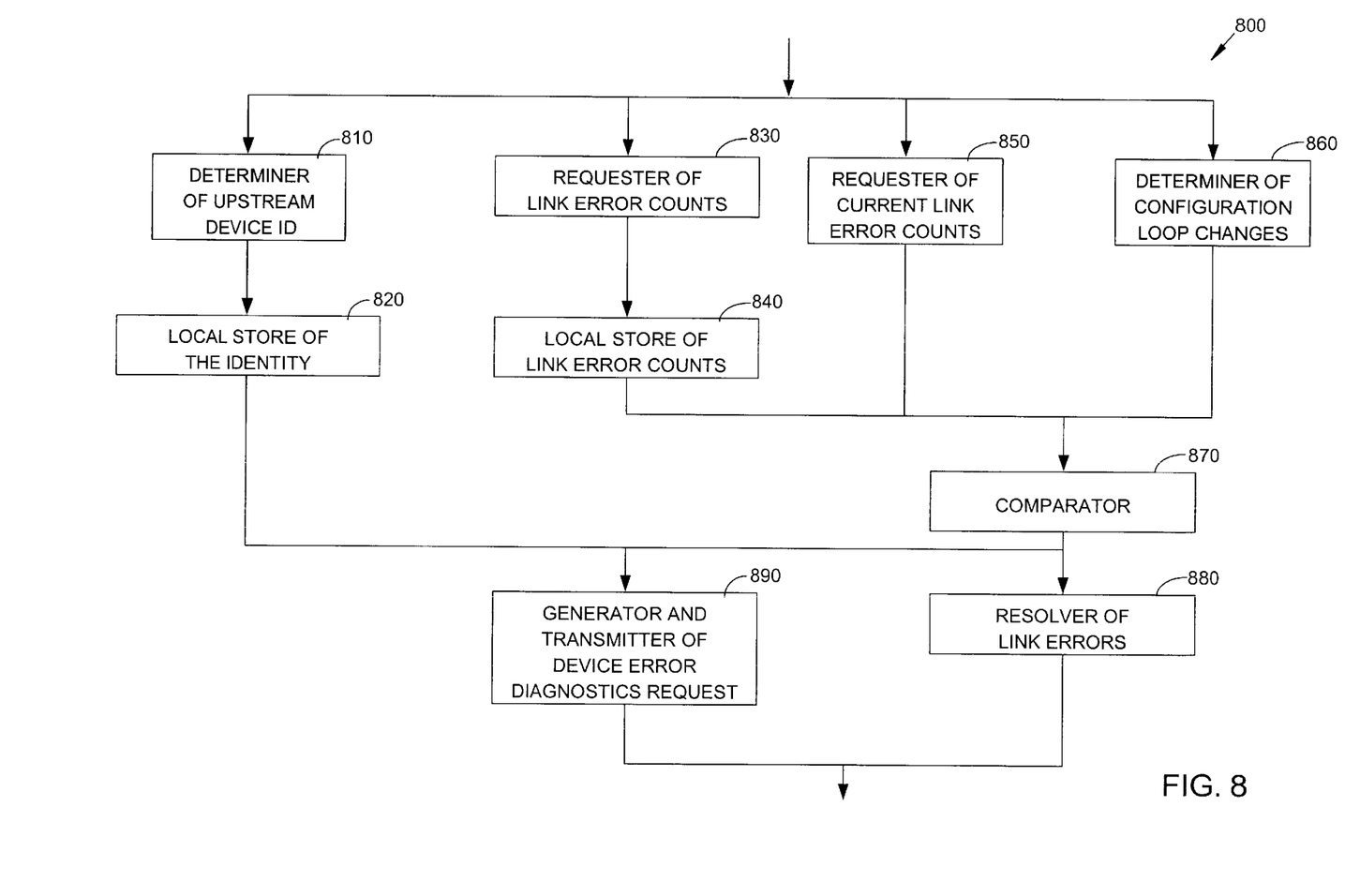
FIG. 8 is a block diagram of a loop error isolation management application in a peer apparatus.

FIG. 8 a block diagram of a loop error isolation management application (MA) 800 in a peer apparatus, such as peer apparatus 700. The MA 800 includes a determiner 810 of the identity (not shown) of an upstream device in the loop. The determiner 810 receives the identity through the communication input/output 710 in FIG. 700. The identity is stored locally on the peer apparatus 700 by a local store 820. The store 820 is operably coupled to the determiner. In one embodiment, the determiner 810 includes a retriever of the identity of an upstream device from a loop map.

MA 800 also includes a requester 830 of link error counts from the upstream device in the loop. The requester 830 is operably coupled to the local store of the link error counts 840. The local store of link error counts 840 stores the link error counts for later historical comparison with current link error count.

MA 800 also includes a requester 850 of a current link error counts from the upstream device in the loop. Requester 850 is coupled to communication input/output 710 in FIG. 700. The requester 850 receives a current count of link errors.

MA 800 also includes a determiner 860 of configuration loop changes. The determiner 860 is operably coupled to the communication input/output 710 in FIG. 700.

The comparator 870 compares the current link error count, received from requester 850, the saved error count received from store 840, and the changes to the loop configuration received from determiner 860, and accordingly invokes either, a resolver of link errors 880 or a generator and transmitter of a device error diagnostics request 890. In one embodiment, the requester 880 includes a link tester.

In one embodiment of apparatus 800, an initializer is operably coupled to the determiner 810 of the identity of an upstream device in the loop, and operably coupled to the local store of the identity 840.

In another embodiment of apparatus 800, a monitor of loop errors, operably coupled to the local store of link error counts, is included. Furthermore, a detector of an error on a communication input of the peer apparatus is coupled to the monitor.

The system 700 and 800 components can be embodied as computer hardware circuitry or as a computer-readable program, or a combination of both.

More specifically, in a computer-readable program embodiment of apparatus 700 and 800, the programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (A.P.I.) or interprocess communication techniques such as remote procedure call (R.P.C.), common object request broker architecture (CORBA), Component Object Model (COM), Distributed Component Object Model (DCOM), Distributed System Object Model (DSOM) and Remote Method Invocation (RMI). The components execute on as few as one computer, or on at least as many computers as there are components.

Figure 9:
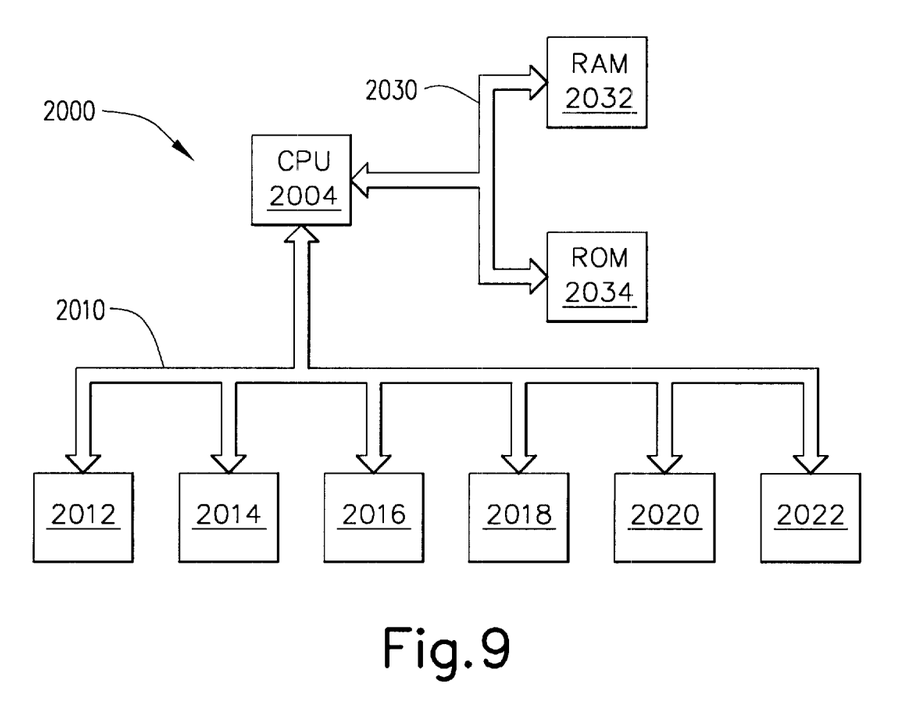
FIG. 9 is a schematic view of a computer system.

FIG. 9 is a schematic view of a computer system. Advantageously, the invention is well-suited for use in a computer system 2000, in which computer system 2000 includes a communication device operably coupled to an upstream device in a loop, and a means for identifying an error condition recorded locally on a device in a distributed daisy-chained peer-to-peer loop. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The information handling system 2000 includes a disc drive device which includes the ramp described above. The information handling system 2000 may also include an input/output bus 2010 and several peripheral devices, such as 2012, 2014, 2016, 2018, 2020, and 2022 may be attached to the input output bus 2010. Peripheral devices may include hard disc drives, magneto optical drives, floppy disc drives, monitors, keyboards and other such peripherals. Any type of disc drive may use the method for loading or unloading the slider onto the disc surface as described above.

The present invention of loop error diagnostics does not require knowledge of the topology of the loop and reduces loop overhead traffic because error isolation is distributed to each of the devices in the loop. Furthermore the effectiveness of loop diagnostics is increased because devices closest to the source of the problem perform the diagnostics. In addition, the present invention minimizes degradation of performance of each device on the loop because the diagnostic function in each device is enabled to execute when the device is idle, thereby, preventing the diagnostics from affecting the performance of the device during higher priority tasks.

Conclusion

In conclusion, a method for managing interconnect errors, the method including the step of identifying an error condition recorded locally 410 on a device in a distributed daisy-chained peer-to-peer loop 100 and the step of diagnosing the error 420. In one embodiment, the method is performed by a device, such as 110, 120, 130, and/or 140. In another embodiment, the distributed daisy-chained peer-to-peer loop includes a FC-AL 150. In yet another embodiment, the device is a disc drive 200.

In still another embodiment, the identifying step 310 includes receiving a current error status count 370 from a local source for an immediately upstream device, 120 or 130, in the distributed daisy-chained peer-to-peer loop 100, receiving a prior error status count 330 from a local source for an immediately upstream device, 120 or 130, in the distributed daisy-chained peer-to-peer loop 150, comparing, as in 375, the current error status count to the prior error status count, and determining that the comparison indicates an error 385. In still yet another embodiment, the receiving step 370 is performed after the receiving step 520.

In a further embodiment, the receiving step 330 is performed during an initialization of the device, 110, 120, 130 and/or 140.

In yet another embodiment, the determining step 540 includes determining that the current error status count is different than the prior error status count 610. When the error status counts are different, the upstream device has also detected an error and the link between the upstream device and the device is not the source of the error.

In an additional embodiment, the diagnosing step 420 includes testing 630 a link between the device and the immediately upstream device in the distributed daisy-chained peer-to-peer loop. The testing step 630 may also include transmitting data from the immediate upstream device to the device through the distributed daisy-chained peer-to-peer loop and determining that the data was not received by the device as it was transmitted.

In a further embodiment, the diagnosing step 420 includes generating an error report 620 indicating that the error is suspected to be in a link between the device and the immediately upstream device in the distributed daisy-chained peer-to-peer loop.

The present invention includes an information handling system 900 that includes a communication device 710 operably coupled to an upstream device in a loop 720 and a means for identifying an error condition recorded locally on a device in a distributed daisy-chained peer-to-peer loop 730.

The present invention also includes a peer apparatus 700 in a loop 150, the apparatus including a communication input 710 and a loop error isolation management application 730 operably in communication with the communication input. One embodiment of the loop error isolation management application 730 includes a determiner of the identity of an upstream device in the loop 810, a local store of the identity 820 in communication with the determiner, a requester of link error counts 830 from the upstream device in the loop, in communication with the store, a local store of the link error counts 840, in communication with the requester 830, a requester of a current link error count from the upstream device in the loop 850, a determiner of configuration loop changes 860, a comparator 870 of the current link error count to the saved error count in communication with the determiner 860, the store of link error counts 840, and the store of current link error counts 850, a resolver of link errors 880 in communication with the comparator, and a transmitter 890 of a device error diagnostics request in communication with the comparator 870 and the store of the identity 820. In one embodiment of the apparatus 700, the peer apparatus 700 includes a disc drive 200 having a base and a disc rotatably attached to the base. In another embodiment, the resolver 880 includes a link tester. In yet another embodiment, the determiner of the identity 810 of an upstream device in the loop includes a retriever of the identity of an upstream device from a loop map. In still another embodiment, the apparatus includes an initializer in communication with the determiner 810 of the identity of an upstream device in the loop and in communication with the local store of the identity.

An information handling system, such as a disc drive, includes a controller that communicates with other devices in a loop, and performs distributed or peer-to-peer loop error diagnostics. One example of a loop is a fiber channel arbitrated loop. Distributed or peer-to-peer loop error diagnostics identifies and diagnoses errors in the immediately upstream device and the immediately upstream link by monitoring the error count to determine of the error count is increasing or not. An increasing error count or a changed loop configuration indicates that the source of the error is not the upstream device, while an unchanging error count and an unchanged loop configuration indicates that the source of the error is the upstream link.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method of loop error diagnostics in a distributed daisy-chained peer-to-peer loop, the method performed by a device in the distributed daisy-chained peer-to-peer loop, the method comprising steps of:
    (a) identifying an error condition locally on the device, the identifying step comprising:
        (a)(1) receiving a current error status count from a local source for an upstream device in the distributed daisy-chained peer-to-peer loop;
        (a)(2) receiving a prior error status count from a local source for an upstream device in the distributed daisy-chained peer-to-peer loop; and
        (a)(3) comparing the current error status count to the prior error status count; and
    (b) diagnosing the error.

2. The method of claim 1, wherein the distributed daisy-chained peer-to-peer loop includes a Fibre-Channel arbitrated loop.

3. The method of claim 1, wherein the method is performed by the device detecting the error.

4. The method of claim 1, wherein the receiving step (a)(1) is performed after the receiving step (a)(2).

5. The method of claim 4, wherein the receiving step (a)(2) is performed during an initialization of the device.

6. The method of claim 1, wherein the method further includes:
    (a)(4) determining that the comparison indicates an error.

7. The method of claim 6, wherein the determining step (a)(4) includes:
    (a)(4)(i) determining that the current error status count is equal to the prior error status count.

8. The method of claim 6, wherein the diagnosing step (b) includes:
    (b)(1) generating an error report indicating that the error is suspected to be in a link between the device and the upstream device in the distributed daisy-chained peer-to-peer loop.

9. The method of claim 6, wherein the determining step (a)(4) includes:
    (a)(4)(i) determining that the current error status count is not equal to the prior error status count.

10. The method of claim 9, wherein the diagnosing step (b) includes:
    (b)(1) determining that the error source is not suspected to be in a link between the device and the upstream device in the distributed daisy-chained peer-to-peer loop.

11. The method of claim 9, wherein the diagnosing step (b) includes:

(b)(1) testing a link between the device and the upstream device in the distributed daisy-chained peer-to-peer loop.

12. The method of claim 11, wherein the testing step (b)(1) includes:

(b)(1)(i) transmitting data from the upstream device to the device through the distributed daisy-chained peer-to-peer loop; and (b)(1)(ii) determining that the data was not received by the device as it was transmitted.

13. The method of claim 1, wherein the device further comprises a disc drive.

14. A peer apparatus in a loop comprising:

a communication input; and a loop error isolation management application operably coupled to the communication input, the loop error isolation management application comprising:

a determiner of the identity of an upstream device in the loop;

a local store of the identity, operably coupled to the determiner;

a requester of link error counts from the upstream device in the loop, operably coupled to the store;

a local store of the link error counts, operably coupled to the requester;

a requester of a current link error count from the upstream device in the loop;

a determiner of configuration loop changes;

a comparator of current link error count to the saved error count, operably coupled to the determiner, the store of link error counts, and the store of current link error counts;

a resolver of link errors, operably coupled to the comparator; and a transmitter of a device error diagnostics request operably coupled to the comparator and the store of the identity.

15. The peer apparatus of claim 14, wherein the peer apparatus includes a disc drive having a base and a disc rotatably attached to the base.

16. The peer apparatus of claim 14, wherein the resolver includes a link tester;

the determiner of the identity of an upstream device in the loop includes a retriever of the identity of an upstream device from a loop map; and the apparatus includes an initializer, operably coupled to the determiner of the identity of an upstream device in the loop, and operably coupled to the local store of the identity.

17. The peer apparatus of claim 14, wherein the peer apparatus further comprises a disc drive.

* * * * *